Patented Dec. 29, 1953

2,664,380

UNITED STATES PATENT OFFICE 2,664,380

WATER-DISPERSIBLE PHENOTHIAZINE PREPARATION

Donald E. Vierling, Pittsburgh, Pa., assignor to Atomic Basic Chemicals Corporation, Pittsburgh, Pa., a corporation of Pennsylvania No Drawing. Application November 2, 1949, Serial No. 125,167

4 Claims. (Cl. 167—53)

This invention relates to a water-dispersible phenothiazine composition and relates particularly to such a composition which is especially adapted for use in preparing a free-flowing aqueous dispersion suitable for use in administering phenothiazine as an anthelmintic.

Phenothiazine (thiodiphenylamine) has been recognized to be a very effective anthelmintic for such animals as sheep, cattle, horses, pigs, goats, poultry and others. It is normally a solid material, however, which is hydrophobic and difficult to disperse and suspend in water. For ease of administration it is highly desirable to use a free-flowing, stable, aqueous dispersion which can be readily prepared by merely adding water to a dry, powdered preparation of phenothiazine. I have discovered that a particular class of wetting agents described hereinafter can be incorporated with powdered phenothiazine to provide such a dry, water-dispersible preparation.

Accordingly, it is an object of this invention to provide a dry, water-dispersible preparation of powdered phenothiazine.

It is a further object to provide a novel composition of matter composed of powdered phenothiazine and a small amount of a non-toxic wetting agent.

It is yet a further object to provide a novel phenothiazine preparation which when mixed with water produces a free-flowing, stable aqueous suspension.

Another object is to provide a dry, water-dispersible phenothiazine preparation which when applied in the 40% suspension commonly recommended for oral administration will have a stability and concentration conducive to easy administration.

A further object is to provide a novel phenothiazine preparation which may be easily and readily dispersed to the desired concentration.

Another object is to provide a dry, water-dispersible phenothiazine preparation containing an edible dispersing agent which does not impair the effectiveness of the phenothiazine.

These and other objects will be apparent from the following description of the invention.

In the administration of phenothiazine as an anthelmintic it has been found that a 40% suspension or dispersion is to be preferred. Such a suspension contains about 12.5 grams of phenothiazine per fluid ounce. Stable aqueous suspensions or dispersions of phenothiazine alone cannot be prepared because the phenothiazine is insoluble and hydrophobic. A wetting or dispersing agent is therefore needed. Various agents have been used in the past, as shown in the Whiting Patents Nos. 2,439,532 and 2,428,444, the Flenner Patent No. 2,407,486, and the Austin Patent No. 2,294,888. Various other agents are also known in the art. The selection of a suitable agent or dispersion system involves various problems. The agent or system should, of course, be substantially non-toxic. Moreover, the agent or system should not impede the action of the phenothiazine so as to reduce its activity or effectiveness.

I have now found that hydroxyphosphatides may be used in small amounts as effective wetting and dispersing agents for phenothiazine. The hydroxyphosphatides are prepared by hydroxylation of unsaturated fatty acid groups in phosphatides to an extent such that the degree of unsaturation of the product is reduced and its stability improved, and such that its dispersibility in water is improved in view of the increase in hydrophilic groups in the phosphatide molecule. The hydroxyl groups introduced into the molecule may be esterified or partially esterified with low aliphatic acids. Methods for preparing the various hydroxy phosphatides which I contemplate for use are described in the Wittcoff Patent No. 2,445,948, dated July 27, 1948. Any phosphatide responding to the product claim of the said Wittcoff patent is suitable for use in this invention. Likewise any material prepared in accordance with the processes described in said patent are suitable; that is, any phosphatide which has been hydroxylated sufficiently to reduce its iodine value by at least about 5% is satisfactory, although more highly hydroxylated products giving reductions in iodine value between 5% and 50% are preferred. I particularly prefer an hydroxyphosphatide whose iodine value is from about 10% to 25% lower than that of the phosphatide from which it was prepared.

A relatively small quantity of the hydroxyphosphatide is sufficient to produce stable aqueous dispersions of phenothiazine. As little as 0.01% by weight may be effective while amounts more than about 2% are seldom required. I prefer to use about 0.1% by weight of hydroxyphosphatide, in the form of an aqueous solution containing 10% by weight of the hydroxyphosphatide, when the iodine value of the hydroxyphosphatide is from 10% to 25% lower than the iodine value of the phosphatide from which the hydroxyphosphatide was prepared. When the reduction in iodine value of a given hydroxyphosphatide is greater or less, or is unknown, a few simple tests with different small amounts of the material readily indicate the amount which is needed to give stable dispersions at any desired concentration of phenothiazine in water.

The hydroxyphosphatide may be dispersed in water after which the dispersion may be mixed with the solid, powdered phenothiazine by any of the usual methods employed for distributing small amounts of liquids into solids. However, since phenothiazine is presently available in a coarse lumpy condition (pea-size) and must be ground to reduce it to a size suitable for easy administration, I prefer to add the dispersion to a given quantity of the coarse powder. By then suitably stirring the mixtures for a short time, the hydroxyphosphatide becomes fairly evenly distributed. The mixture may then be passed into a ball or impact mill where it is comminuted to the desired size. This last treatment promotes very uniform mixing of the hydroxyphosphatide with the particles of phenothiazine. The treated powder may then be dried, if necessary, to produce a free-flowing product. I have found that such treated powders disperse readily in water.

The following examples illustrate the principles of my invention:

Example 1

One-tenth part by weight of soya bean phosphatide which has been hydroxylated sufficiently to yield about a 20% reduction in iodine value was dispersed in about nine-tenths part by weight of water, and the dispersion was then added to 99 parts by weight of pea-size phenothiazine NF. The resulting mixture was introduced into the feed screws of a hammer-type pulverizer. The feed screws thoroughly mixed the phosphatide dispersion with the phenothiazine and the subsequent action of the impact hammers perfected the dissemination. The finely ground material (all 300 mesh or finer) could be readily dispersed by adding 60 parts of water to 40 parts of the treated phenothiazine powder. The dispersion so made contained about 12½ grams of phenothiazine per fluid ounce of dispersion and was of good stability, flowed freely, and when administered as an anthelmintic was found to be highly effective.

Example 2

Similar results were secured when the phosphatide of Example 1 was replaced with a "commercial lecithin" which had been hydroxylated sufficiently to effect a reduction of about 10% in its iodine value.

Example 3

Similar results were secured when the phosphatide of Example 1 was replaced with commercial lecithin derived from corn oil which had been hydroxylated sufficiently to reduce the iodine value about 20%.

Example 4

Similar results were secured when the phosphatide of Example 1 was replaced with .075 part by weight of crude soya lecithin which had been hydroxylated sufficiently to reduce its iodine value about 30%.

Example 5

Similar results were secured when the phosphatide of Example 1 was replaced with .05 part by weight of crude soya lecithin which had been hydroxylated sufficiently to reduce its iodine value about 40%.

Examples 6–12

The following table indicates amounts of hydroxyphosphatides which may be used in the invention, depending on the raw material which is hydroxylated, on the extent of hydroxylation and on the hydroxylation agents employed.

| Example | Material treated | Hydroxylation agents | Final $I_2$ value | Reduction in iodine value | Percentage added to phenothiazine |
|---|---|---|---|---|---|
|  |  |  |  | Percent | Percent |
| 6 | Crude soya phosphatide | $H_2O_2$+lactic acid | 94.5 | 5.5 | 0.2 |
| 7 | ____do____ | Peracetic | 89.3 | 11.2 | 0.1 |
| 8 | ____do____ | $H_2O_2$+tartaric acid | 77.0 | 23.0 | 0.075 |
| 9 | ____do____ | $H_2O_2$+citric acid | 82.7 | 17.3 | 0.1 |
| 10 | ____do____ | $H_2O_2$ | 84.0 | 16.1 | 0.1 |
| 11 | Commercial lecithin | $H_2O_2$+$H_2SO_4$ | 71.5 | 12.8 | 0.1 |
| 12 | ____do____ | $H_2O_2$+acetic acid | 47.5 | 50.4 | 0.05 |

It will be understood from the foregoing examples that hydroxyphosphatides from any source, animal or vegetable, may be used in practising this invention, and that the hydroxylation treatment of the phosphatides may be carried out in a variety of ways and with a wide variety of hydroxylation agents. The method of hydroxylation should be no limitation on this invention. It will also be understood that unhydroxylated phosphatides such as crude lecithin, refined lecithin and refined cephalin are not as effective as hydroxylated phosphatides for my purposes. These materials should be hydroxylated sufficiently to reduce the iodine value by at least 5% in order to make them useful for my purposes as described hereinabove. It will also be understood that aqueous dispersions of phenothiazine treated with hydroxyphosphatides may be made so as to contain any desired concentration of phenothiazine, but that a 40% concentration is preferred. Numerous variations within the ability of one skilled in this art may be made in the preparation of dispersible phenothiazine powders without departing from the principles of my invention as defined in the following claims.

Having described my invention, what I claim is:

1. A dry, powdered free-flowing composition of matter capable of being dispersed in water to yield a stable fluid suspension, said preparation being composed essentially of powdered phenothiazine and a substantially uniform dissemination therewith of a small amount of a phosphatide which has been hydroxylated sufficiently to reduce its iodine value at least 5%.

2. A composition of matter as claimed in claim 1 wherein the hydroxylation of said phosphatide is sufficient to reduce its iodine value by at least 5% and at most 50%, and wherein the amount of said hydroxylated phosphatide is below about 0.2% by weight on the phenothiazine.

3. A water-wettable, dry, powdered anthelmintic preparation capable of being stably dispersed in water to form a fluid anthelmintic drench, said preparation being composed essentially of 99 parts by weight of comminuted phenothiazine and 0.1 part by weight of a phosphatidic material which has been hydroxylated sufficiently to reduce its iodine value at least about 10% and not more than about 25%.

4. A stable, aqueous dispersion composed essentially of about 40 parts by weight of the anthelmintic preparation claimed in claim 3 and about 60 parts of water.

DONALD E. VIERLING.

References Cited in the file of this patent

UNITED STATES PATENTS

| Number | Name | Date |
|---|---|---|
| 2,407,486 | Flenner | Sept. 10, 1946 |
| 2,445,948 | Wittcoff | July 27, 1948 |
| 2,455,054 | Geiger | Nov. 30, 1948 |

OTHER REFERENCES

DuPont Magazine, October 1940, page 10.
Goodman—Cosmetic Dermatology (1936) page 155.
U. S. Dispensatory, 24th ed. (1947), page 1503.